US007689585B2

(12) United States Patent
Zeng et al.

(10) Patent No.: US 7,689,585 B2
(45) Date of Patent: Mar. 30, 2010

(54) REINFORCED CLUSTERING OF MULTI-TYPE DATA OBJECTS FOR SEARCH TERM SUGGESTION

(75) Inventors: Hua-Jun Zeng, Beijing (CN); Benyu Zhang, Beijing (CN); Zheng Chen, Beijing (CN); Wei-Ying Ma, Beijing (CN); Li Li, Kirkland, WA (US); Ying Li, Bellevue, WA (US); Tarek Najm, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 10/826,159

(22) Filed: Apr. 15, 2004

(65) Prior Publication Data

US 2005/0234972 A1 Oct. 20, 2005

(51) Int. Cl.
*G06F 7/00* (2006.01)
(52) U.S. Cl. .................................................. 707/103 Y
(58) Field of Classification Search .............. 707/103 R
See application file for complete search history.

(56) References Cited

U.S. PATENT DOCUMENTS 5,224,206 A 6/1993 Simoudis
5,297,042 A 3/1994 Morita
5,361,628 A 11/1994 Marko et al.
5,418,948 A 5/1995 Turtle
5,442,778 A * 8/1995 Pedersen et al. ............... 707/5
5,488,725 A 1/1996 Turtle et al.
5,694,592 A 12/1997 Driscoll
5,794,237 A 8/1998 Gore, Jr.
5,812,134 A * 9/1998 Pooser et al. ............... 715/848
5,819,258 A 10/1998 Vaithyanathan et al.
5,845,278 A 12/1998 Kirsch et al.
5,987,460 A 11/1999 Niwa et al.
6,003,027 A 12/1999 Prager
6,006,225 A 12/1999 Bowman et al.
6,112,202 A * 8/2000 Kleinberg ...................... 707/5

(Continued)

FOREIGN PATENT DOCUMENTS

DE 10029644 1/2002

(Continued)

OTHER PUBLICATIONS

Boyan et al., "A Machine Learning Architecture for Optimizing Web Search Engines", AAAI Workshop on Internet-Based Information Systems, 1996, pp. 1-8, Retrieved from the Internet http://www.cs.cornell.edu/People/tj/publications/boyan_etal_96a.pdf.

(Continued)

*Primary Examiner*—Tim T. Vo
*Assistant Examiner*—Aaron Sanders
(74) *Attorney, Agent, or Firm*—Lee & Hayes, PLLC

(57) ABSTRACT

Systems and methods for related term suggestion are described. In one aspect, relationships among respective ones of two or more multi-type data objects are identified. The respective ones of the multi-type data objects include at least one object of a first type and at least one object of a second type that is different from the first type. The multi-type data objects are iteratively clustered in view of respective ones of the relationships to generate reinforced clusters.

22 Claims, 8 Drawing Sheets

U.S. PATENT DOCUMENTS

| | | | | |
|---|---|---|---|---|
| 6,167,398 | A | 12/2000 | Wyard et al. | |
| 6,169,986 | B1 * | 1/2001 | Bowman et al. | 707/5 |
| 6,188,776 | B1 | 2/2001 | Covell et al. | |
| 6,189,002 | B1 | 2/2001 | Roitblat | |
| 6,226,408 | B1 | 5/2001 | Sirosh | |
| 6,298,351 | B1 | 10/2001 | Castelli et al. | |
| 6,400,828 | B2 | 6/2002 | Covell et al. | |
| 6,470,307 | B1 | 10/2002 | Turney | |
| 6,556,983 | B1 | 4/2003 | Altschuler et al. | |
| 6,560,600 | B1 | 5/2003 | Broder | |
| 6,615,209 | B1 | 9/2003 | Gomes et al. | |
| 6,628,821 | B1 | 9/2003 | Covell et al. | |
| 6,697,998 | B1 | 2/2004 | Damerau et al. | |
| 6,711,585 | B1 | 3/2004 | Copperman et al. | |
| 6,742,003 | B2 * | 5/2004 | Heckerman et al. | 707/104.1 |
| 6,760,714 | B1 | 7/2004 | Caid et al. | |
| 6,772,120 | B1 | 8/2004 | Moreno et al. | |
| 6,892,193 | B2 | 5/2005 | Bolle et al. | |
| 6,944,602 | B2 | 9/2005 | Cristianini | |
| 7,027,975 | B1 | 4/2006 | Pazandak et al. | |
| 7,136,876 | B1 | 11/2006 | Adar et al. | |
| 2001/0049688 | A1 | 12/2001 | Fratkina et al. | |
| 2002/0015366 | A1 | 2/2002 | Sawano | |
| 2002/0165849 | A1 * | 11/2002 | Singh et al. | 707/1 |
| 2002/0178153 | A1 | 11/2002 | Nishioka et al. | |
| 2003/0046389 | A1 | 3/2003 | Thieme | |
| 2003/0065632 | A1 | 4/2003 | Hubey | |
| 2003/0110181 | A1 * | 6/2003 | Schuetze et al. | 707/103 R |
| 2003/0200198 | A1 | 10/2003 | Chandrasekar et al. | |
| 2003/0208482 | A1 | 11/2003 | Kim et al. | |
| 2003/0226100 | A1 | 12/2003 | Farahat et al. | |
| 2003/0233370 | A1 | 12/2003 | Barabas et al. | |
| 2004/0010331 | A1 | 1/2004 | Terada et al. | |
| 2004/0030556 | A1 | 2/2004 | Bennett | |
| 2004/0117189 | A1 | 6/2004 | Bennett | |
| 2004/0193560 | A1 | 9/2004 | Atamer | |
| 2004/0249808 | A1 | 12/2004 | Azzam et al. | |
| 2004/0255301 | A1 * | 12/2004 | Turski et al. | 719/316 |
| 2005/0015366 | A1 | 1/2005 | Carrasco et al. | |
| 2005/0055321 | A1 | 3/2005 | Fratkina et al. | |
| 2005/0055341 | A1 * | 3/2005 | Haahr et al. | 707/3 |
| 2005/0097188 | A1 | 5/2005 | Fish | |
| 2005/0120112 | A1 | 6/2005 | Wing et al. | |
| 2005/0216443 | A1 | 9/2005 | Morton et al. | |

FOREIGN PATENT DOCUMENTS

| | | |
|---|---|---|
| EP | 0809197 | 2/2001 |
| EP | 1320042 | 6/2003 |
| WO | WO9749048 | 12/1997 |
| WO | WO9948028 | 9/1999 |
| WO | WO0217118 A2 | 2/2002 |

OTHER PUBLICATIONS

Frei et al., "The Use of Semantic Links in Hypertext Information Retrieval" Information Processing & Management, Elsevier, Barking, GB, vol. 31, No. 1, Jan. 2, 1995, pp. 1-13.

Li, "Toward a Qualitive Search Engine" Internet Computing, IEEE, vol. 2, No. 4, Jul. 1998, pp. 24-29, Retrieved from the Internet at http://ieeexplore.ieee.org/xpl/abs_free.jsp?arNumber=707687.

Marchioro, Massimo, "The Quest for Correct Information on the Web: Hyper Search Engines" Computer Networks and ISDN Systems, North Holland Publishing. Amsterdam, NL, vol. 29, No. 8-13, Sep. 1997, pp. 1225-1235.

Attardi, G. et al.: "Automatic web Page Categorization by Link and context Analysis" Proceedings of THIA, European Symposium on Intelligence, 1999. *The whole document*.

Brin S et al: "The anatomy of a large-scale hypertextual web search engine" Computer Networks and ISDN Systems, North Holland Publishing. Amsterdam, NL, vol. 30, No. 1-7, Apr. 1998, pp. 107-117.

Harmandas, V. et al. "Image Retrieval by Hypertext Links" Association for Computing Machinery. Proceedings of the 20th Annual INternational ACM-SIFIR Conference on Research and Development in INformation Retrieval. Philadelphia, PA, Jul. 27-31, 1997, pp. 296-303.

Smith, J.R. et al.: "An Image and Video Search Engine for the World-Wide Web" Storage and retrieval for image and video databases 5. San Jose, Feb. 13-14, 1997, Proceedings of SPIE, Bellingham, SpIE, US, vol. 3022, pp. 84-95.

Westerveld, T. et al: "Retriving Web Pages using Content, Links, URLs and Anchors" Test Retrieval Conference. Proceedings, XX, XX, 13, Nov. 2001,pp. 663-672.

Beeferman D. & Berger A. "Agglomerative clustering of a search engine query log" Proceedings of the ACM SIGKDD. International cnference on Knowledge Discovery and Data Mining, ACM, US, 2000, pp. 407-416, XP002339640.

Qiu et al, "Concept Based Query Expansion", SIGIR Forum, Association for Computing Machinery, New York, Jun. 27, 1993, pp. 160-169.

Kim et al, "A Comparison of Collocation-Based Similarity Measures in Query Expansion", Information Processing & Management, Elsevier Science Ltd, vol. 35, No. 1, Jan. 1999 pp. 19-30.

Raghavan et al, "On the Reuse of Past Optimal Queries", SIGIR '95, Proceedings of the 18th Annual International ACM SIGIR Conference on Research and Development in Information Retrieval, Jul. 9, 1995, pp. 344-350.

Srivastava et al. "Discovery and Applications of Usage Patterns from Web Data" Sigkdd Explorations, Jan. 2000 (2000-20001), pp. 12-23, XPoo2241892 *The whole document*.

Slattery S. et al.; "Combining Statistical and Relational Methods for Learning in Hypertext Domains" Lecture Notes in Computer Science, 1998, pp. 38-52.

Chakrabarti S."Data Mining for Hypertext: A tutorial survey" SIGKDD Explorations vol. 1 issue 2, Jan. 2000, 11 pages.

Cohn et al.; "The Missing Link—A Probabilistic Model of Document Content and Hypertext Connectivity" Proceedings of Neural Information Processing Systems, 2001, 7 pages.

Dhillon et al.; "Efficient Clustering of Very Large Document Collections" Data Mining,for Scientific and Engineering Applications, Chapter 1, Kluwer Academic Publishers, 2001, pp. 1-25.

Liu et al.; "Clustering Through Decision Tree Construction" 9th International Conference on Information and Knowledge Management, 2000, 10 pages.

Kleinberg J. M.; "Authoritative Sources in a Hyperlinked Environment" Proceedings of the ACM-SIAM Symposium on Discrete Algorithms, 1998, 34 pages.

Heer et al.; "Identification of Web User Traffic Composisiton using Multi-Modal Clustering and Information Scent" 1st SIAM ICDM Workshop on Web Mining. Chicago 2001. 13 pages.

Gibson et al.; "Inferring Web Communities from Link Topology" Proceedings of the 9th ACM Conference on Hypertext and Hypermedia,1998, 17 pages.

Neville et al; "Iterative Classification in Relational Data" Proceedings AAAI-2000 Workshop on Learning Statistical Models form Relational Data, AAAI Press 2000, pp. 42-49.

Steinbach et al.; "A Comparison of Document Clustering Techniques" 6th ACM SIGKDD World Text Mining Conferece Boston, 2000, 2 pages.

Su et al.; "Correlation-based Document Clustering using Web Logs" Proceedings of the 34th Hawaii International Conference on Sytem Sciences, 2001, 7 pages.

Taskar et al.; "Probabilistic Classification and Clustering in Relational Data" Proceedings of the 34th Hawaii International Conference on System Sciences. 2001. 7 pages.

Unger et al.; "Clustering Methods for Collaborative Filtering" In Workshop on Recommendation System at the 15th National Conference on Artificial Intelligence, 1998, 16 pages.

Wen et al.; "Query Clustering Using User Logs" ACM Transactions on Information Systems vol. 20 No. 1; Jan. 2002, pp. 59-81.

Zeng et al; "A Unified Framework for Clustering Heterogeneous Web Objects" Proceedings of the 3rd international Conference of Web Information System Engineering, Singapore 2002, 10 pages.

"Open Directory Project" http://dmoz.org/ Netscape, 1998-2004 1 page.

Berkhin P.; "Survey of Clustering Data Mining Techniques" Accrue Software Inc.; 2002 pp. 1-56.

Yang et al.; "A Comparative Study on Feature Selection in Text Categorization" Proceedings of the Fourteenth International Conference on Machine Learning, Morgan Kaufmann Publishers Inc., San Francisco 1997, pp. 412-420.

Huaizhong et al., Similarity Model and Term Association For Document Categorization, Sep. 2-6, 2002, pp. 256-260.

Kim et al., "A Comparison of Collocation-Based Similarity Measures in Query Expansion", Inform ation Processing and Management, Elsevier, Garking, GB, vol. 35, No. 1, Jan. 1999, pp. 19-30.

McDonald, et al., "Evaluating a Content Based Image Retrieval System", SIGIR'01, Sep. 9-12, 2001, ACM, 2001, pp. 232-240.

Shaw, Term-Relevance Computautions and Perfect Retrieval Performance Information Processing and Management, Elsevier, Barking, GB, vol. 31, No. 4, Jul. 1995, pp. 491-498.

Yeung et al., "Improving Performance of Similarity-Based Clustering by Feature Weight Learning," Apr. 2002, vol. 24, Issue 4, pp. 556-561.

Costa, et al, "Cluster analysis using self-organizing maps and image processing techniques", IEEE, vol. 5, 1999, pp. 367-372.

Dara, et al., "Clustering unlabeled data with SOMs improves classification of labeled real-world data", IJCNN, vol. 3, 2002, pp. 2237-2242.

Dasgupta, et al, "Homotopy-Based Semi-supervised hidden markov tree for texture analysis", IEEE, vol. 2, 2006, pp. 97-100.

Grira, et al., "Semi-supervised image database categorization using pairwise constraints", IEEE, vol. 3, 2005, pp. 1228-1231.

Gutfinger, et al., "Robust classifiers by mixed adaptation", IEEE, vol. 13, 1991, pp. 552-567.

Keswani, "Text Classification with Enhanced Semi-Supervised Fuzzy Clustering", IEEE, vol. 1, 2002, pp. 621-626.

Handl, et al., "Semi-supervised feature selection via multiobjective optimization", IJCNN, 2006, pp. 3319-3326.

Jean, et al, "A robust semi-supervised EM-based clustering algorithm with a reject option", vol. 3, pp. 399-402.

Kang, et al., "Categorization and Keyword identification of unlabeled documents", IEEE, 2005, pp. 1-4.

Lange, et al., "Learning with constrained and unlabelled data", IEEE, vol. 1, 2005, pp. 731-738.

Lee, et al., "Equilibrium-based support vector machine for semisupervised classification", IEEE, 2007, pp. 1-1.

Li, "Constrained Minimum cut for classification using labeled and unlabeled data", IEEE, vol. 2, 2001, pp. 597-602.

Morii, "A Generalized K-Means Algorithm with semi-supervised weight coefficients", ICPR, vol. 3, 2006, pp. 198-201.

Qin, et al., "Subspace Clustering and Label propagation for active feedback in image retrieval", MMM, 2005, pp. 172-179.

Santos, "Biased clustering methods for image classification", SIBGRAPI, 1998, pp. 278-285.

Shimosaka, et al., "Efficient margin-based query learning on action classification", IEEE, 2006, pp. 2778-2784.

Tang, et al., "Semi-Supervised Clustering of corner-oriented attributed Graphs", Hybrid intelligent Systems, 2006, pp. 33-33.

Wu, et al., "Clustering-training for data stream mining", IEEE, 2006, pp. 653-656.

Jespersen, et al., "Evaluating the Markov Assumption for Web Usage Mining", ACM, 2003, pp. 82-89.

Jimenez, et al., "The Influence of Semantics in IR using LSI and K-means Clustering Techniques", retrieved on May 8, 2007, at <<http://portal.acm.org/citation.cfm?id=963656&jmp=abstract &coll=ACM&dl=ACM&CFID..>>, ACm, vol. 19, 2003, pp. 278-284.

Li, et al., "Research and Design of an Efficient Collaborative Filtering Predication Algorithm", IEEE, 2003, pp. 171-174.

Mahajan, et al, "Improved Topic-Dependent Language Modeling Using Information Retrieval Techniques", IEEE, 1999, pp. 541-544.

Myka, et al, "On Automatic Similarity Linking in Digital Libraries", IEEE, 1997, 278-283.

"Microsoft Computer Dictionary", Fifth Edition, Microsoft Press, 2002, 2 pages.

Chuang, et al., "Automatic Query Taxonomy Generation for Information Retrieval Applications" Online Information Review, vol. 27, No. 4, 2003, XP002476002, pp. 243-255.

Wang et al., "ReCoM: Reinforcement Clustering of Multi-Type Interrelated Data Objects", ACM, 2003, pp. 1-8.

Notice of First Office Action for China Patent Application No. 200510071689.8, mailed on Jan. 18, 2008, 15 pgs.

* cited by examiner

REINFORCED CLUSTERING OF MULTI-TYPE DATA OBJECTS FOR SEARCH TERM SUGGESTION

RELATED APPLICATIONS

This patent application is related to the following patent applications, each of which are commonly assigned to assignee of this application, and hereby incorporated by reference:

U.S. patent application Ser. No. 10/427,548, titled "Object Clustering Using Inter-Layer Links", filed on May 1, 2003; and U.S. patent application Ser. No. 10/825,894, titled "Related Term Suggestion for Multi-Sense Query", filed on Apr. 15, 2004.

TECHNICAL FIELD

This disclosure relates to data mining, and more particularly to clustering of heterogeneous objects to enhance systems and methods for search term suggestion.

BACKGROUND

A keyword or phrase is a word or set of terms submitted by a Web surfer to a search engine when searching for a related Web page/site on the World Wide Web (WWW). Search engines determine the relevancy of a Web site based on the keywords and keyword phrases that appear on the page/site. Since a significant percentage of Web site traffic results from use of search engines, Web site promoters know that proper keyword/phrase selection is vital to increasing site traffic to obtain desired site exposure. Techniques to identify keywords relevant to a Web site for search engine result optimization include, for example, evaluation by a human being of Web site content and purpose to identify relevant keyword(s). This evaluation may include the use of a keyword popularity tool. Such tools determine how many people submitted a particular keyword or phrase including the keyword to a search engine. Keywords relevant to the Web site and determined to be used more often in generating search queries are generally selected for search engine result optimization with respect to the Web site.

After identifying a set of keywords for search engine result optimization of the Web site, a promoter may desire to advance a Web site to a higher position in the search engine's results (as compared to displayed positions of other Web site search engine results). To this end, the promoter bids on the keyword(s) to indicate how much the promoter will pay each time a Web surfer clicks on the promoter's listings associated with the keyword(s). In other words, keyword bids are pay-per-click bids. The larger the amount of the keyword bid as compared to other bids for the same keyword, the higher (more prominently with respect to significance) the search engine will display the associated Web site in search results based on the keyword.

Conventional systems and techniques to identify bid term(s) relevant to Web site content typically use clustering algorithms to partition a set of objects into groups, or clusters in such a way that objects from the same cluster are similar and objects from different clusters are dissimilar. Such clustering approaches assume that data objects to be clustered are independent and of identical class, and are often modeled by a fixed-length vector of feature/attribute values. In the recent surge of data mining research, this classical problem has been re-examined in the context of large databases. However, homogeneity of data objects to be clustered seems still the basic assumption, even though some emerging applications, such as Web mining and collaborative filtering, propose challenges to such an assumption. In such applications, data objects are of different types and are highly interrelated. Unfortunately, even though objects distributed across heterogeneous object types may be highly interrelated, conventional clustering operations typically cluster respective object types individually and without consideration of any interrelated aspects of different object types.

One reason for this is because relationships between data objects of different type are often sparse and difficult to identify. Another reason is because representation of any such relationships with a static fixed-length value vector attached to respective objects, wherein the vector represents both object attributes and attributes of a related object of a different type, would create object attribute/feature vectors with a very high dimensionality (feature space). Such high dimensionality is not desirable because the data will be far apart from each other in the feature space, and efficient models cannot be sufficiently trained with such a sparse amount of data in small regions.

Accordingly, better clustering techniques to identify and group related objects (e.g., terms) in view of relationships across heterogeneous data objects would be useful. These clustering techniques could be used, for example, to provide systems and methods that identify term(s) for search engine optimization and term bidding, and thereby provide both with a substantially higher probability of identifying relevant term(s).

SUMMARY

Systems and methods for related term suggestion are described. In one aspect, intra-layer and/or inter-layer relationships among respective ones of two or more multi-type data objects are identified. The respective ones of the multi-type data objects include at least one object of a first type and at least one object of a second type that is different from the first type. The multi-type data objects are iteratively clustered in view of respective ones of the relationships to generate reinforced clusters.

BRIEF DESCRIPTION OF THE DRAWINGS

In the figures, the left-most digit of a component reference number identifies the particular figure in which the component first appears.

DETAILED DESCRIPTION

Overview

Figure 1:
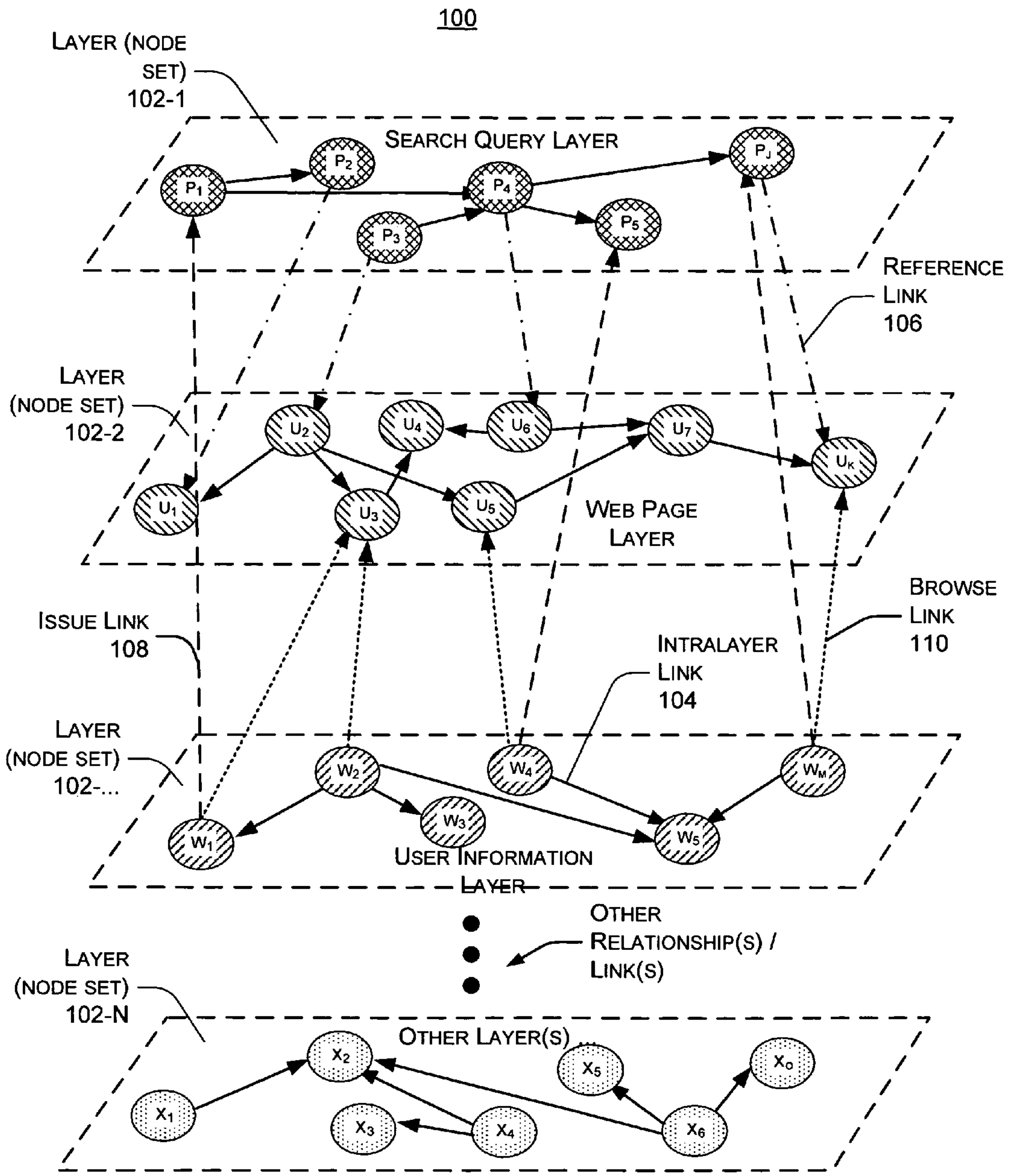
FIG. 1 shows a multi-layered framework graph 100, wherein the graph includes multiple layers 102 of heterogeneous data objects/nodes and associated interlayer and intra-layer data object links/relationships.

FIG. 1 shows an exemplary framework 100 of interrelated heterogeneous object data types. The framework 100 includes multiple layers 102 of heterogeneous data objects/nodes and associated interlayer and intralayer data object links/relationships. Each layer 102-1 through 102-N includes a respective set of same type (homogenous) data objects or nodes. That is node set P includes one or more data objects $p_1$ through $p_j$ that are each of the same data type, node set U includes one or more data objects $u_1$ through $u_k$ that are each of the same data type, and so on. As such, the types of data objects that are in different respective layers 102 are heterogeneous with respect to one another.

In this implementation, for example:

- Layer 102-1 is a mined search query includes search query data object(s)/node(s) $p_1$ through $p_j$. The search query objects include query term(s) and are representative of respective ones of historical queries mined from a query log, as described below.
- Layer 102-2 is a mined Web page layer includes Web page data objects(s)/node(s) $u_1$ through $u_k$.
- Layer 102-3 is a mined user layer and includes user information object(s)/nodes $w_1$ through $w_m$.
- Layer 102-N is shown to illustrate that there can be any number of layers 102 comprising respective different object types $x_1$ through $x_o$.

Lines/links extending between a pair of data objects represent respective mined relationships determined to exist between the respective data objects. In certain embodiments of clustering, the lines/links are referred to as "edges". The generalized term line or link is used in this disclosure to describe links, edges, or any connector of one object to another object that describes a relationship between the objects. Link direction (as provided by the arrowheads indicating that a relationship between data objects) may be directed in either direction as a function the participating objects attributes. The links are considered illustrative and not limiting in scope. Certain links in a Web environment such as represented by framework 100 may be more appropriately directed in one direction, and the direction of the arrowhead typically will not affect the following described reinforced clustering operations.

Links between object pairs can be classified as being intralayer or interlayer links. An intralayer link is illustrative of an identified relationship between different objects of the same type. As such intralayer links 104 connect objects within a same layer 102. For instance, solid line 104 between a respective pair of data objects represents an intralayer link. In this example, an intralayer link extends from a Web page object $u_2$ to another Web page object $u_3$, and represents relation(s) between different Web pages.

An inter-layer link describes relationships between data objects of different types. Since interlayer links extend between respective ones of a pair of heterogeneous objects, each of the participating pair of data objects is shown on a different respective data object/node set layer 102. As shown in FIG. 1, any line connecting a pair of objects that is not a solid line is an interlayer link. E.g., link 106 is indicative of a reference (e.g., a hyperlink) from a first of a pair of objects to a second of the pair of objects, link/line 108 is indicative of an issue shared/referenced (e.g., subject matter) from a first of a pair of objects to a second of the pair of objects, link/line 110 is indicative of a browse link from a first of a pair of objects to a second of the pair of objects. In another example, a link may extend from a user object $w_4$ to a search query object $p_5$ and to a Web page object $u_5$, and represent the user submitting a query that returns a Web page selected a relevant by the user.

In the example of FIG. 1, and as shown by respective ones of the intra and interlayer links, the different objects types (p, u, w, . . . ) are related. For example, a user (represented by objects w) issues queries (objects p); the user browses web pages (objects u) returned by a search engine responsive to receipt of the issued queries; and each search query (object p) references one or more respective Web pages (objects u). In view of this, when Web user information is clustered, Web page(s) a user has browsed and queries used to obtain the respective Web page(s) should have more similarity and tend to be clustered together in the clustering process. Similarly, when clustering Web pages, it should also be taken into consideration how the Web pages are used by users and referenced by respective search queries. To address this, as described below, a reinforced clustering algorithm clusters such heterogeneous data objects as a function of mined relationships between respective ones of the data objects.

One aspect of this disclosure is based on an intrinsic mutual relation, wherein objects being clustered are provided with links to other objects. Certain ones of the links (and the objects to which those links connect) that connect to each object can be weighted with different importance to reflect their relevance to that object. For example, objects of the same types as those being clustered can be provided with greater importance than objects of a different type. This disclosure provides a mechanism by which varying levels of importance can be assigned to different objects or different types of objects. This assigning of different levels of importance to different objects (or different types of objects) is referred to herein as clustering with importance. The varying levels of importance of the different objects often results in improved clustering results and effectiveness. These and other aspects of reinforced clustering of multi-type data objects for search term suggestions are now described.

Term(s)/keyword(s) relevant to a Web site and determined to be used more often in generating search queries by end users are generally selected by Web site promoters/advertisers for search engine result optimization with respect to the Web site. With this in mind, the following disclosed systems and methods mine multi-type data objects determined to be interrelated to the task at hand, which in this implementation, is search term suggestion. Such multi-type data objects include term(s) of mined historical search queries that have been enhanced with semantic context (e.g., text, URLs, result titles, and short descriptions of each result, etc.) mined from results obtained by submitting the historical queries to a search engine, a set of Web pages selected by a user responsive to a particular historical search query, information specific to the user (e.g., the user's Web site access information, IP address of the machine used to generate the search query, etc.), and/or types of related data objects.

Similarity between these multi-type data objects is determined as a linear combination of identified and weighted content similarity and calculated inter-object and intra-object relationship similarities. The data objects are assigned different weights by analyzing the link structure derived from the inter-object and intra-type relationships. Thus, the similarity between respective ones of the data objects includes not only the similarity of their own attributes but also the similarity of their relationships.

In view of these calculated multi-type object relationships, a reinforced clustering algorithm iteratively clusters the multi-type data objects as a function of each object's identified inter and intra-object relationship attributes. In this implementation, a modified direct-k-means clustering algorithm is used to determine the cluster centroids by using the weighted sum of the objects in the cluster. This is an iterative process that propagates clustering results to all related data objects by updating their respective relationship attributes. That is, the clustering results of one type of object forms a new feature space, which is then projected and propagated to other related but different types of objects. Then clustering on related types of objects is performed with this updated feature space. This iterative reinforcement process is executed on each object types to merge substantially related cluster nodes to reduce feature space dimensionality, and continued until clustering results across all multi-type objects have converged. This results in reinforced clusters of substantially highly related multi-type data objects.

Responsive to receiving a term from an end-user, the systems and methods compare the term(s) to respective ones of the term(s) in the reinforced clusters based on a term/query object type. Since the reinforced term clusters include term(s) that are contextually related to one another, when the submitted bid is compared to the terms within the clusters, the term phrase is evaluated in view of any multiple related contexts, or "senses." Moreover, since each reinforced term cluster is derived from sets of highly related multi-type objects, the algorithm can overcome the flaws of pure content-based method, i.e. efficiently reinforce the semantic relationships between query terms and restrain the impact of noise in the term context. Responsive to comparing the received term to feature spaces of objects in the reinforced clusters, one or more search term suggestions are identified. These search term suggestions are communicated to the end-user.

An Exemplary System

Although not required, the invention is described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
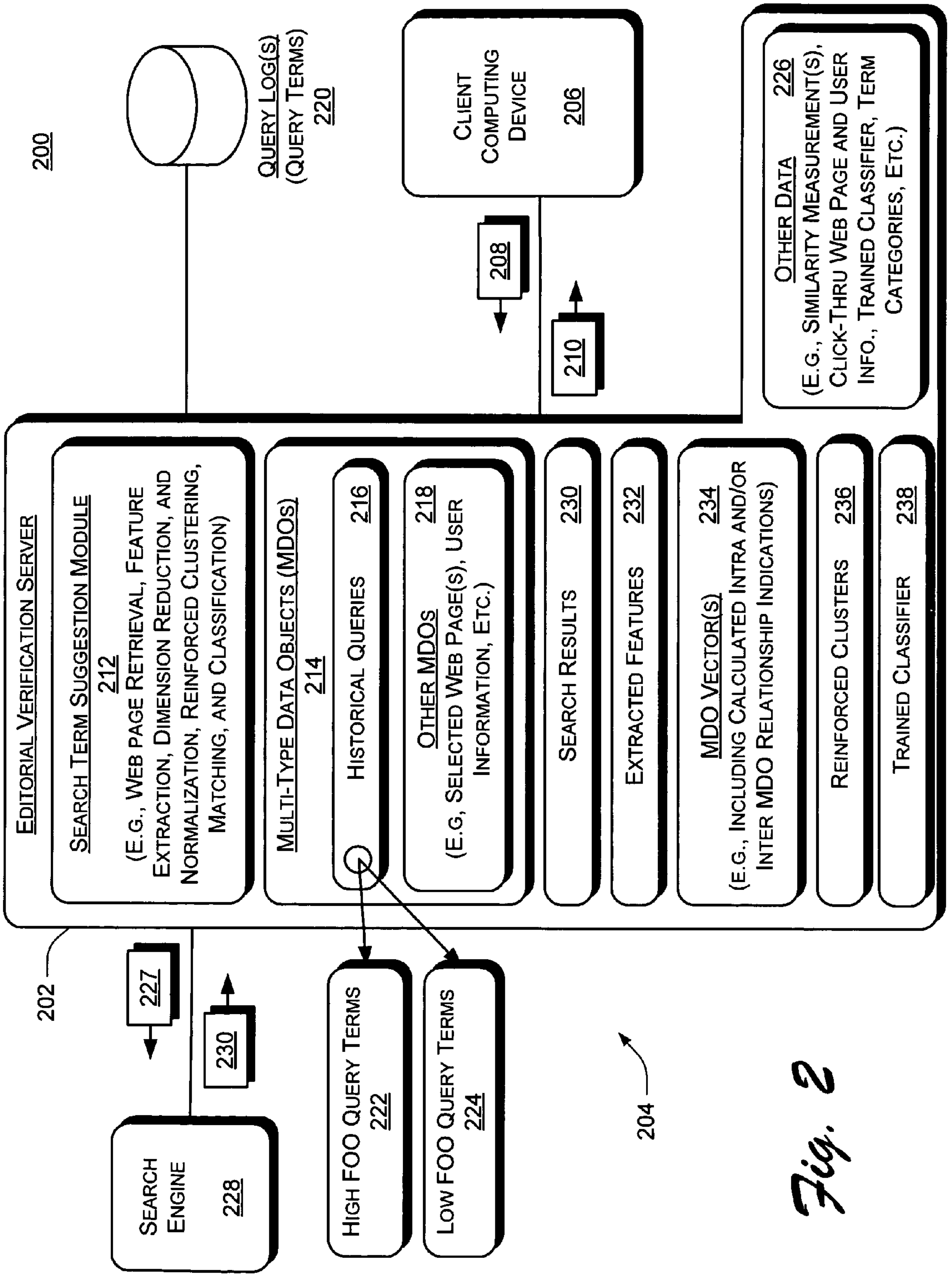
FIG. 2 illustrates an exemplary system for reinforced clustering of multi-type data objects for search term suggestion.

FIG. 2 shows an exemplary system 200 for reinforced clustering of multi-type data objects for search term suggestion. In this implementation, system 200 includes editorial verification server (EVS) 202 coupled across a network 204 to client computing device 206. Responsive to receiving term (s) 208, for example from client computing device 206 or another application (not shown) executing on EVS 202, EVS 202 generates and communicates suggested term list 210 to the client computing device 206 to allow an end-user to evaluate a set of terms semantically and/or contextually related to the term(s) 208 prior to actually bidding on the term(s). Network 204 may include any combination of a local area network (LAN) and general wide area network (WAN) communication environments, such as those which are commonplace in offices, enterprise-wide computer networks, intranets, and the Internet. When system 200 includes a client computing device 206, the client computing device is any type of computing device such as a personal computer, a laptop, a server, a mobile computing device (e.g., a cellular phone, personal digital assistant, or handheld computer), etc.

EVS 202 includes a number of computer-program modules to generate suggested term list 210. The computer-program modules include, for example, search term suggestion (STS) module 212. In this implementation, and for purposes of discussion and exemplary illustration, the STS module 212 is described as performing multiple functions such as historical query term mining, Web page retrieval, feature extraction, feature space dimension reduction and normalization, reinforced clustering of multi-type data objects, matching user bid term(s) to contents of reinforced clusters to perform search term suggestion, and term classification. It can be appreciated that respective ones of these operations could be performed by one or more other computer program modules (not shown) in communication with STS module 212.

Enhancing Mined Historic Search Queries d with Semantic Context

STS module 212 mines multi-type data objects (MDOs) 214 determined to be interrelated to the task at hand, which in this implementation, is search term suggestion. Such multi-type data objects 214 include term(s) of mined historical search queries 216, which will be enhanced by STS module 212 with semantic context (e.g., text, URLs, result titles, and short descriptions of each result, etc.) mined from search results obtained by submitting respective ones of the historical queries 216 to a search engine, and "other MDOs" 218 such as a set of Web pages selected by a user responsive to a particular historical search query, information specific to the user (e.g., the user's Web site access information, IP address of the machine used to generate the search query, etc.), and/or types of related multi-type data objects.

In particular, STS module 212 retrieves a set of historical queries 216 from query log(s) 220. The historical queries 216 include search query terms previously submitted by one or more users to a search engine. STS module 212 evaluates historical queries 216 as a function of frequency of occurrence to identify high frequency of occurrence (FOO) search terms 222 and relatively lower frequency of occurrence search terms 224. In this implementation, a configurable threshold value is used to determine whether a historical query has a relatively higher or low frequency of occurrence. For example, search query terms in historical queries 216 that occur at least a threshold number of times are said to have a high frequency of occurrence. Analogously, search query terms in historical queries 216 that occur less than the threshold number of time are said to have a low frequency of occurrence. For purposes of illustration, such a threshold value is shown as a respective portion of "other data" 226.

STS module 212 mines semantic/contextual meaning high frequency of occurrence query terms 222 by submitting each query, one-by-one (search query 227), to search engine 228. Responsive to receiving search query 227, search engine 228, returns a ranked listing (whose number is configurable) in search result(s) 230 to STS module 212. The ranked listing includes URLs, result titles, and short descriptions and/or contexts of query term related to the submitted search query 227. The ranked listing is stored in the search results 230. Such search result retrieval is done for each search query 227.

STS module 212 parses Web page Hypertext Markup Language (HTML) to extract the URLs, result titles and short descriptions and/or contexts of the query term for each query term 222 from each retrieved search result(s) 230. The URLs, result titles, short descriptions and/or contexts of the query term, and the search query 227 used to obtain the retrieved Search result(s) 230 are stored by STS module 212 in a respective record of extracted features 232.

After parsing search results 230 for the high frequency of occurrence query terms 222, STS module 212 performs text preprocessing operations on extracted features 232 to generate linguistic tokens (tokenize) from the extracted features into individual keywords. To reduce dimensionality of the tokens, STS module 212 removes any stop-words (e.g., "the", "a", "is", etc.) and removes common suffixes to normalize the keywords, for example, using a known Porter stemming algorithm. STS module 212 arranges the resulting extracted features 232 into one or more term based multi-type data object (MDO) vectors 234.

Each term based multi-type data object vector 234 has dimensions based on term frequency and inverted document frequency (TFIDF) scores. A weight for the $i^{th}$ vector's $j^{th}$ keyword is calculated as follows:

$$w_{ij}=TF_{ij}\times\log(N/DF_j)$$

wherein $TF_{ij}$ represents term frequency (the number of occurrences of keyword j in the $i^{th}$ record), N is the total number of query terms, and $DF_j$ is the number of records that contain keyword j.

Given the vector representation of each query term, a cosine function is used to measure the similarity between a pair of terms (recall that the vectors were normalized):

$$\mathrm{sim}(q_j, q_k)=\sum_{i=1}^{d} w_{ij}\cdot w_{ik}$$

Thus, the distance between the two terms (a similarity measurement) is defined as:

$$\mathrm{dist}(q_j, q_k)=1-\mathrm{sim}(q_j, q_k)$$

Such similarity measurements are shown as a respective portion of "other data" 226. Exemplary such similarity values are shown in an exemplary suggested term list 210 of TABLE 1 described below.

Mining User Selected Web Page(s) and User Information

To identify a substantially most relevant set of term(s) for search engine result optimization of a Web site (search term suggestion), STS module 212 mines multi-type data objects 214 that are different/heterogeneous than the historical queries 216. For purposes of discussion, these mined objects are represented as "other MDOs" 218. In one implementation, "other MDOs" 218 include, for example, end-user selected Web pages and/or user specific information, wherein the user is one associated with submitting a historical query 216 to a search engine 228. STS module 212 extracts end-user selected Web pages from query log(s) 220. The end-user selected Web pages may or may not be sparse, wherein sparse averages, for example, two (2) to three (3) Web pages per historical query 216. STS module 212 extracts user specific information from query log(s) 220, or from other data sources. User specific information includes, for example, Internet Protocol (IP) address of the machine used to submit respective ones of the historical queries 216, GUID, and/or Web site access information (e.g., Microsoft's .net Passport information).

Reinforced Multi-Type Data Object Clustering

STS module 212 fully explores relationships between multi-type interrelated data objects (MDOs 214) for clustering analysis. Multi-type data objects 214 include n different types of objects $X_1, X_2, \ldots, X_n$ (e.g., historical queries 216 and "other MDOs" 218). Each type of data object $X_i$ is described by a set of features $F_i$. Data objects within the same type are interrelated with intra-type relationships $R_i\subseteq X_i\times X_i$. Data objects from two different types are related through inter-type relationships $R_{ij}\subseteq X_i\times X_j$. To distinguish from the relationships, $F_i$ is referred to as content feature of data objects. For a specific object $x\in X_i$, we use $x.F_i$ to represent its content features, and use $x.R_i\subseteq X_i$ and $x.R_{ij}\subseteq X_j$ to denote objects related to it in $X_i$ and $X_j$, respectively. The problem of clustering multi-type interrelated data objects is to partition each type of objects $X_i$ into $K_i$ clusters so that the data objects in each cluster have high similarity, and objects from different clusters are dissimilar.

Considering that an object of multi-type data objects 214 has both content features and relationships with other object (s) in multi-type data objects 214, similarity between two objects is determined according to the following:

$$S=\alpha\cdot s_f+\beta\cdot s_{intra}+\gamma\cdot s_{inter} \quad (1)$$

where $s_f$ is content similarity, $s_{intra}$ and $s_{inter}$ are intra-type and inter-type similarities, respectively, α, β, and γ are weights for different similarities with $\alpha+\beta+\gamma=1$.

From (1), the similarity between two objects is a linear combination of content similarity and relationship similarities. By assigning different values to α, β, and γ, STS module 212 can adjust/configure the weights of different similarities in the overall similarity. For example, if $\alpha=1$, $\beta=\gamma=0$, similarity between content features is considered. By setting $\beta=0$, STS module 212 bypasses the effects of intra-type similarity.

Similarity in Equation 1 can be defined using different functions, usually determined by the types of objects and the applications. For example, content similarity between two web-pages could be defined as cosine function $x\in Xy_i\in x.R_Y$ of the two keyword vectors derived from their contents.

A relationship feature of a particular object is represented by an MDO vector 234 whose entries correspond to its related objects. In one implementation, each entry is a numeric value corresponding to the weight of the relationship. For example, given two object types $X=\{x_1, x_2, \ldots x_m\}$, and $Y=\{y_1, y_2, \ldots y_n\}$, the inter-type relationship vector of object is defined as $V_x=[v_1, v_2, \ldots, v_n]^T$ where $v_i\neq 0$ and if, and $v_i=0$ otherwise. Then the similarity $S_{inter\text{-}XY}$ on inter-type relationship $R_{XY}$ between the two objects in X could be also defined as the cosine function of the two vectors.

If objects in $X_i$ have inter-type relationships with multiple data object types, the final inter-type relationship similarity could be the linear combination of all inter-type similarities.

With the defined similarity functions, STS module 212 identifies intralayer relationships/links and interlayer links among historical queries 216 and "other MDOs" 218. Use of interlayer links in clustering recognizes that clustering of one type of object may be affected by another type of object. For example, clustering of web page objects may be affected by user object configurations, state, and characteristics. Accordingly, these mined intra and interlayer relationships are used to improve cluster quality of interrelated data objects, as described below. Mined inter-layer and intra-layer data object relationships are stored in each object's respective MDO vector 234.

In one implementation, identified inter-layer links/relationships represent, for example, one or more of the following:

- Content related information, for example, links within a historical query 216 and corresponding ones of user selected (clicked-thru) Web pages.

User interest on an associated topic, as determined, for example, by links within a historical query 216 and the user specific information.

User interest on a selected Web page, as determined, for example, via links between the user specific information and a selected Web page.

In one implementation, identified intra-layer links/relationships (relationships between objects of a same data type) represent, for example one or more of:

Links within queries, as described in greater detail below.

Recommended Web page(s) as indicated by directed in/out hyperlinks within user selected Web pages.

Human relationships, for example, as indicated by relationships/links identified between respective users. In one implementation, this type of relationship information is mined from calculated similarity of user profiles. User profiles include, for example, demographics, geographic location, interest(s), and so on. In one implementation, user profiles are access via Web site access information supplied by respective users.

With respect to links within queries, intralayer relationships indicated by links within queries represent links between an initial historical query 216 and/or subsequent query refinements (also represented by respective ones of the historical queries 216). In one implementation, such information is extracted from click-thru Web page information retrieved from query log(s) 220. More particularly, upon determining that initial search query results are not satisfactory, it is estimated that the user will submit one or more refined queries to a search engine 228 within a configurable amount of time from the time that the initial query was submitted. The configurable amount of time represents a query session. After one or more such search query term refinements, the user may obtains satisfactory search results. For example, consider that a user visits a product support Web site and submits an initial query of "cookie". Upon determining that the search results are not satisfactory (e.g., too broad), the user may change/refine terms of the query to "enable cookie" to obtain a more satisfactory search result.

In one implementation, STS module 212 identifies links within queries by segmenting one or more portions of query log(s) 220 into respective query sessions. Each query session may include an initial query, one or more query refinements, and possibly one or more Web page click-thru indications. To categorize an initial query and one or more associated query refinements, STS module 212 calculates term similarity between queries of each query session. Search queries meeting one or ore threshold criteria of similarity are selected for generating the links within queries and corresponding query refinements. In one implementation, query similarity is determined, for instance, using the exemplary operations described above in paragraph.

After mapping relationships among multi-type data objects 214 as relationship feature modeled in corresponding ones of the MDO vectors 234, each type of data objects could be clustered individually with conventional clustering techniques (i.e., not using the reinforced clustering operations disclosed herein). However, even though clustering data object individually may at first appear feasible, this technique is substantially limited and problematic. One reason for this is because the number of objects becomes very large, as the size of the feature vector for relationship will be very large. And similarity defined on relationship features, which is based on exact matching of related objects will suffer from the sparseness of non-zero entries. Another reason is because conventional clustering techniques do not consider that relationship (s) among data objects may not be fully reflected in features assigned to data objects, but may only be discovered during the clustering process itself. That is, existing clustering techniques do not consider that clustering operations in turn can provide structuralized information that is useful in reinforcing data in subsequent analysis/clustering operations.

STS module 212 addresses these problems/limitations of conventional clustering techniques at least by propagating clustering results of one data object type to all its related data object types by updating their respective relationship features. That is, STS module 212 generated reinforced clusters 236 by aggregating indicated data object relationship(s) to individual multi-type data objects 214 based on content of the reinforced clusters 236. For instance, if two candidate nodes exist following the clustering, the closest two candidate nodes can be merged, e.g., by averaging the vector values of the two candidate nodes. This merging allows individual nodes to be combined to reduce the number of nodes that have to be considered As such, dimensionality of the MDO vector(s) 234 is reduced. Then, STS module 212 clusters the MDO vector(s) 234. This process is iteratively performed until clustering results in all object types converge.

The iterative clustering projection technique relies on obtaining clustering information from separate types of objects that are arranged in separate layers, with each layer containing a homogenous type of object. The node information in combination with the link information is used to iteratively project and propagate the clustered results (the clustering algorithm is provided between layers) until the clustering converges. That is, each type of the different kinds of nodes and links are examined to obtain structural information that can be used for clustering. Structural information, for example, can be obtained considering the type of links connecting different data objects (e.g., whether a link is an inter-layer link or an intra-layer link). Iteratively clustering results of one type of object into the clustering results of another type of object can reduce clustering challenges associated with data sparseness. With this iterative projecting, the similarity measure in one layer clustering is calculated on clusters instead of individual groups of clusters of another type.

For example, in view of two object types $X=\{x_1, x_2, \ldots x_m\}$, and $Y=\{y_1, y_2, \ldots y_n\}$ to illustrate the process. STS module 212 first clusters the objects in Y into k clusters, denoted by $\{C_1, C_2, \ldots, C_k\}$ using any traditional clustering method. Recall that an MDO vector 234, which includes a relationship feature vector of $x \in X$, is originally defined as $V_x=[v_1, v_2, \ldots, v_n]^T$ with each component corresponding to one object in Y. With clusters in Y, we replace the $V_x$ by $V_x'=[v_1', v_2', \ldots, v_k']^T$ with each component corresponding to one cluster of Y and $v_i'$ is non-zero if $x.R_Y \cap C_i \neq \Phi$. The numeric value of $v_i'$ could be set to $|x.R_Y \cap C_i|$, which represent the number of relationships from object x to objects in cluster $C_i$, or other values such as the importance of the associated objects (object importance is described below). Then the clustering of object in X is based on the new inter-type relationship feature. The process will continue by iteratively project the clustering results of one type to another by their inter-layer relationship until converge.

The advantage of the above reinforced clustering algorithm is that the clustering results not only reflect the data distribution from the content, but also reflect the relationships with other data types. It may also solve the data sparseness problem to some extent. Compared to existing clustering approaches which define similarity on fixed feature space, the described systems and methods for reinforced clustering of multi-type data objects updates similarity between two objects during the clustering process to adapt to the new discovered relationship feature space. Furthermore, in one implementation, any traditional clustering algorithm can be embedded into this proposed framework to enhance clustering performance.

Link Analysis and Importance of Objects

For some data objects and applications, multi-type data objects 214 in the same type may have different importance in the clustering process. Typical examples include Web-page/user clustering where certain Web pages are more important as they are authoritative pages, and item/user clustering for collaborative filtering, etc. where some users should be more authoritative in determining the belongingness of items. If we view objects as nodes and view relationship(s) between objects as links, a conventional link analysis method, such as HITS algorithm, is used to calculate the eigen-values of each data object. However, when multiple types of data objects are involved, this method will not work since the importance of different types of objects is not comparable.

To address this problem, the described systems and methods for reinforced clustering of multi-type data objects extend the HITS algorithm as follows. We not only consider the mutual reinforcement of object importance within a type but also the mutual reinforcement between types. Each node is assigned a hub score and an authority score.

For simplicity, we continue to use the case which contains two types of interrelated objects as example to illustrate our proposed algorithm. Given two types of objects $X=\{x_1, x_2, \ldots x_m\}$, $Y=\{y_1, y_2, \ldots y_n\}$ and relationships of $R_X$, $R_Y$, $R_{XY}$ and $R_{YX}$ if directionality is considered. The adjacent matrixes are used to represent the link information. $L_X$ and $L_Y$ stand for the adjacent matrixes of link structures within set X and Y, respectively. $L_{XY}$ and $L_{YX}$ stand for the adjacent matrixes of links from objects in X to objects in Y. For example, $L_{XY}(i, j)=1$ if there is one link from node $x_i$ to node $y_j$.

There are two levels of calculations: one is that the hub value and authority value of objects from same type reinforce each other by the intra-type relationships; and the other is that the importance of different types of nodes reinforces each other by inter-type relationships. The calculations in this approach are written as follows.

$$\begin{cases} a(X) = \beta L_X^T h(X) + (1-\beta) L_{XY} i(Y) \\ h(X) = \beta L_X a(X) + (1-\beta) L_{XY} i(Y) \\ i(X) = a(X) + h(X) \\ \\ a(Y) = \gamma L_Y^T h(Y) + (1-\gamma) L_{YX} i(X) \\ h(Y) = \gamma L_Y a(Y) + (1-\gamma) L_{YX} i(X) \\ i(Y) = a(Y) + h(Y) \end{cases} \quad (2)$$

where, a(X) and h(X) are the authority score and hub score of nodes within X, respectively. Similarly, a(Y) and h(Y) stand for the authority and hub score of nodes in Y; i(X) and i(Y) stand for the importance of the node in X and Y, respectively. $\beta$ and $\gamma$ are the weight parameters to adjust the influence of links derived from different relationships, and T means to transpose the corresponding matrix.

At the beginning of the calculation, all vectors, a(X), h(X), a(Y) and h(Y) are initialized to 1. The hub score and authority score are updated using Equation (2) at each iteration. At the end of each iteration, the vectors will be normalized for the next iteration calculation. This algorithm provides a normalized and uniform importance within each object types and gets more reasonable result by considering the importance of the associated objects of other types through inter-type relationships.

Given the importance score of objects, the described reinforced clustering process is modified to reflect the importance of objects. In this implementation, k-means clustering algorithm is modified to weighted-k-means algorithm. That is, when calculating the cluster centroids, we use the weighted sum of cluster members as the new centroid such that a cluster is biased to those important objects.

In view of the above, STS module 212 differentiates importance of multi-type data objects based on both inter- and intra-type relationships among the multi-type data objects 214. This importance is incorporated into the clustering process Exemplary Processing of a Bid Term Responsive to receiving the term(s) 208 from an end-user (e.g., an advertiser, Web site promoter, etc), STS module 212 compares the term(s) 208 to respective ones of the terms/phrases in the reinforced term clusters 236. Since reinforced term clusters 236 include terms that are not only contextually related to one another, but also semantically related to one another derived from their interrelationships to webpages and users, the term(s) 208 is evaluated in view of multiple related and historical contexts, or "senses."

In one implementation, if STS module 212 determines that term(s) 208 matches a term(s) from a reinforced cluster 236, search term suggestion module 212 generates suggested term list 210 from the reinforced cluster 236. In this implementation, a match may be an exact match or a match with a small number of variations such as singular/plural forms, misspellings, punctuation marks, etc. The returned list is ordered by a combination of FOO and confidence value.

In one implementation, if a term(s) matches a term from a cluster, the cluster is returned to the end-user in a suggested term list. The suggested term list 210 includes terms/phrases determined to be semantically and/or contextually related to the term(s), respective term(s) to term(s) similarity measurements (confidence values), and respective term(s) frequency of occurrence (FOO). The returned list 210 is ordered by a combination of FOO and confidence value.

If STS module 212 determines that term(s) 208 matches terms in multiple reinforced term clusters 236, search term suggestion module 212 generates multiple suggested term lists 210 from terms in the multiple ones of reinforced term clusters 236. The lists are ordered by the cluster sizes; and the terms within each list are ordered by a combination of FOO and confidence value.

If no matching clusters are identified, the query term is further matched against expanded clusters generated from query terms with low FOO. In one implementation, query terms with low FOO are clustered by training a classifier (e.g., a K-nearest neighbor classifier) for the reinforced term clusters 236 generated from the high frequency of occurrence historical query log terms. Historical query terms determined to have low frequency of occurrence are submitted, one-by-one, to the search engine. Features are then extracted from select ones (e.g., a first top-ranked Web page, and/or so on) of the returned search results. The extracted features are normalized and used to represent the query terms with low FOO. The query terms are then classified into existing clusters to generate expanded clusters based on the trained classifier. The end-user submitted term(s) is then evaluated in view of these expanded clusters to identify and return a suggested term list to the end-user.

Classification of Low FOO Terms

When reinforced term clusters 236 generated from high frequency of occurrence (FOO) query terms 222 do not include same terms to end-user input term(s) 208, STS module 212 generates trained classifier 238 from reinforced term clusters 236 generated from high frequency of occurrence (FOO) query log terms 222. The terms in reinforced term clusters 236 already have corresponding keyword vectors in a vector space model suitable for classification operations. Additionally, stop-word removal and word stemming (suffix removal) reduced dimensionality of term vectors 234 (upon which clusters 236 are based). In one implementation, additional dimensionality reduction techniques, for example, feature selection or re-parameterization, may be employed.

In this implementation, to classify a class-unknown query term 222, STS module 212 uses the k-Nearest Neighbor classifier algorithm to find k most similar neighbors in all class-known query terms 222, relying on their corresponding feature vectors, and uses the a weighted majority of class labels of the neighbors to predict the class of the new query term. Here each query term already in reinforced term clusters 236 is assigned a label same to their corresponding clusters' label, while each reinforced cluster 236 is labeled by simple sequence numbers. These neighbors are weighted using the similarity of each neighbor to X, where similarity is measured by Euclidean distance or the cosine value between two vectors. The cosine similarity is as follows:

$$\mathrm{sim}(X, D_j) = \frac{\sum_{t_i \in (x \cap D_j)} x_i \cdot d_{ij}}{\|X\|_2 \cdot \|D_j\|_2}$$

where X is the test term, i.e. the query term to be classified, represented as a vector; $D_j$ is the jth training term; $t_i$ is a word shared by X and $D_j$; $x_i$ is the weight of keyword $t_i$ in X; $d_{ij}$ is the weight of keyword $t_i$ in $D_j$; $\|X\|_2=\sqrt{x_1^2+x_2^2+x_3^2}$ is the norm of X, and $\|D_j\|_2$ is the norm of $D_j$. Thus, the class label of the test term X is the weighted majority of all neighbors' class labels:

$$\mathrm{label}(X) = \underset{l_i}{\mathrm{argmax}}\left( \sum_{All\ D_j\ where\ lable(D_j)=l_i} \mathrm{sim}(X, D_i) \right)$$

In another implementation, a different statistical classification and machine learning technique (e.g., including regression models, Bayesian classifiers, decision trees, neural networks, and support vector machines) other than a nearest-neighbor classification technique is used to generate trained classifier 238.

STS module 212 submits low frequency of occurrence (FOO) query terms 224, one-by-one (via a respective search query 227), to search engine 228. Responsive to receiving search result(s) 230 associated with a particular search query 227, and using techniques already described, STS module 212 extracts features (extracted features 232) from one or more retrieved search results 230 identified by the search result(s) 230. In this implementation, features are extracted from a first top-ranked Search result(s) 230. For each retrieved and parsed Search result(s) 230, STS module 212 stores the following information in a respective record of extracted features 232: the URLs, result titles, short descriptions and/or contexts of the query term, and search query 227 used to obtain the retrieved Search result(s) 230. Next, STS module 212 tokenizes, reduces dimensionality, and normalizes extracted features 232 derived from low FOO query terms 224 to generate term vectors 234. Then, STS module 212 clusters the query terms into a respective set of term clusters 236. This clustering operation is performed using trained classifier 238 (generated from high FOO query terms 222).

STS module 212 evaluates end-user submitted term(s) 208 in view of these expanded term clusters (generated based on low FOO query terms 224) to identify and return one or more suggested term lists 210 to the end-user. An exemplary such procedure is described above, and in the following section.

An Exemplary Search Term Suggestion List

A suggested term list 210 includes, for example, term(s) determined to be related to the term(s) 208, respective term(s) to term(s) 208 similarity measurements (confidence values), and respective term(s) frequency of occurrence (FOO)—frequency in the historical query log. Techniques for identifying related term(s), generating similarity measurements, and generating FOO values have been described above.

TABLE 1 shows an exemplary suggested term list 210 of terms determined to be related to term(s) 208 of "mail." Terms related to term(s) 208 are shown in this example in column 1, titled "Suggested Term."

TABLE 1

AN EXEMPLARY SUGGESTED TERM LIST FOR THE BID TERM "MAIL"

| Suggested Term | Similarity | Frequency | <Context> |
|---|---|---|---|
| hotmail | 0.246142 | 93161 | online e- |
| yahoo | 0.0719463 | 165722 | mail related |
| mail.com | 0.352664 | 1455 | |
| yahoo mail | 0.0720606 | 39376 | |
| www.mail.com | 0.35367 | 711 | |
| email.com | 0.484197 | 225 | |
| www.hot | 0.186565 | 1579 | |
| www.msn.com | 0.189117 | 1069 | |
| mail.yahoo.com | 0.0962268 | 4481 | |
| free email | 0.230611 | 1189 | |
| www.aolmail.com | 0.150844 | 654 | |
| check mail | 0.221989 | 66 | |
| check email | 0.184565 | 59 | |
| msn passport | 0.12222 | 55 | |
| www.webmail.aol.com | 0.0200538 | 108 | |
| webmail.yahoo.com | 0.08789 | 71 | |
| free email account | 0.0234481 | 65 | |
| Suggested term | Similarity | Frequency | |
| mail | 1 | 2191 | Traditional |
| usps | 0.205141 | 4316 | mail related |
| usps.com | 0.173754 | 779 | |
| united parcel service | 0.120837 | 941 | |
| postal rates | 0.250423 | 76 | |
| stamps | 0.156702 | 202 | |
| stamp collecting | 0.143618 | 152 | |
| state abbreviations | 0.104614 | 300 | |
| postal | 0.185255 | 66 | |
| postage | 0.180112 | 55 | |
| postage rates | 0.172722 | 51 | |
| usps zip codes | 0.138821 | 78 | |
| us postmaster | 0.109844 | 58 | |

Referring to TABLE 1, note that terms in the suggested term list are mapped to term similarity values (see, column 1, titled "Similarity") and frequency of occurrence scores (see, column 3, titled "Frequency"). Each term similarity value, calculated as described below in the section titled "Term Clustering", provides a similarity measure between a corresponding suggested term (column 1) and the term(s) 208, which is "mail" in this example. Each frequency value, or score, indicates the number of times that the suggested term occurs in the historical query log. The suggested term list is sorted as a function of term similarity, and/or frequency of occurrence scores as a function of business goals.

Any given term(s) 208 (e.g., mail, etc.) may have more than a single context within which the bid term may be used. To account for this, STS model 212 provides an indication in suggested term list 210 of which suggested terms correspond to which of the multiple contexts of term(s) 208. For example, referring to TABLE 1, the term(s) 208 of "mail" has two (2) contexts: (1) traditional off-line mail and (2) online e-mail. Note that a respective list of related terms is shown for each of these two bid term contexts.

Additionally, suggested terms for any term(s) 208 may be more than synonyms of the bid term. For instance, referring to TABLE 1, the suggested term "usps" is an acronym for an organization that handles mail, not a synonym for the bid term "mail." However, "usps" is also a term very related to a "mail" bid term, and thus, is shown in the suggested term list 210. In one implementation, STS model 212 determines the relationship between a related term R (e.g. "usps") and a target term T (e.g. "mail") as a function of the following association rule: itr(T)→itr(R), wherein "itr" represents "interested in". If a user (advertiser, Web site promoter, and/or the like) is interested in R, the user will also be interested in T.

An Exemplary Procedure

Figure 3:
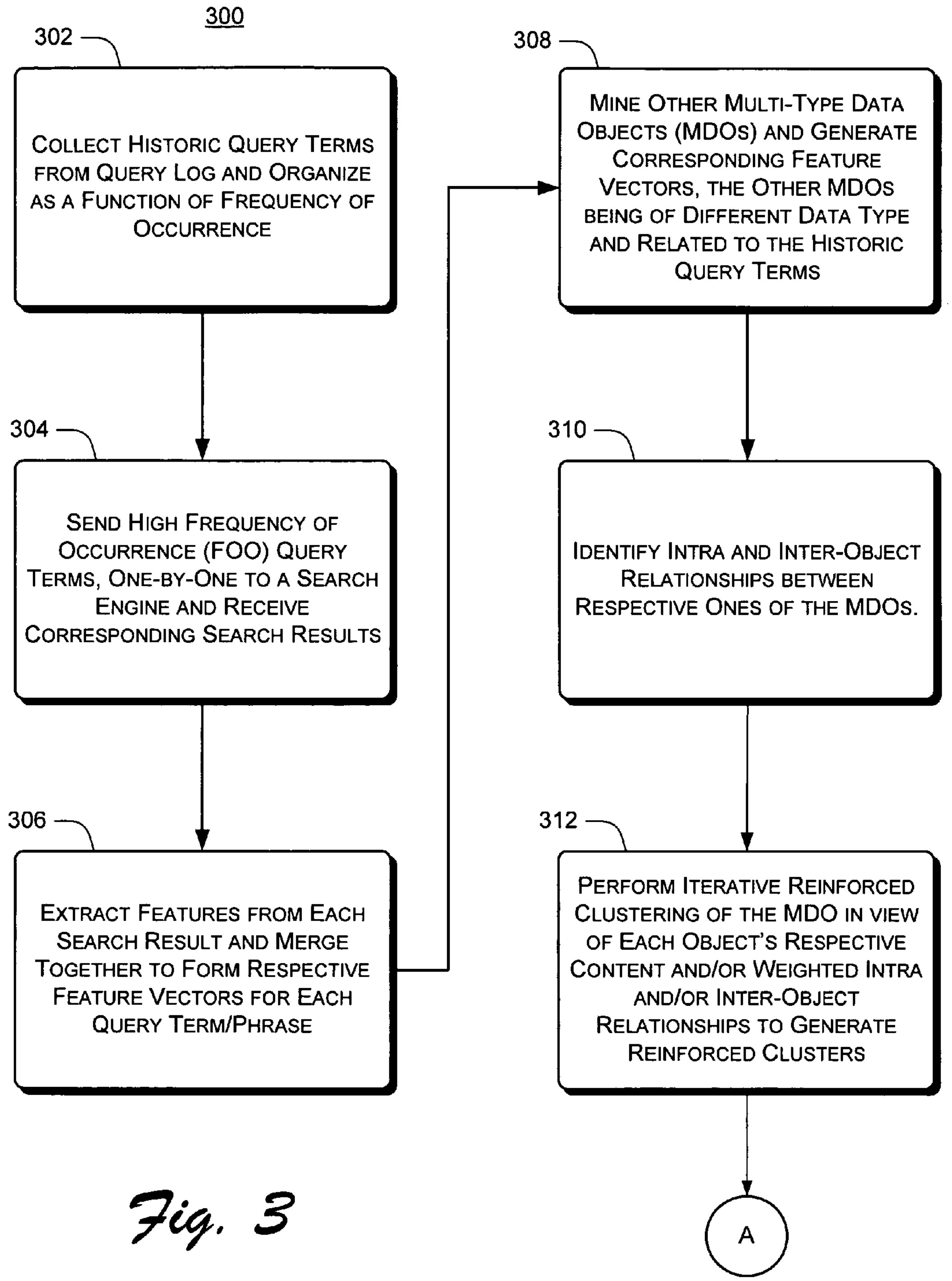
FIG. 3 illustrates an exemplary procedure for reinforced clustering of multi-type data objects for search term suggestion.

FIG. 3 illustrates an exemplary procedure 300 for reinforced clustering of multi-type data objects for search term suggestion. For purposes of discussion, operations of the procedure are discussed in relation to the features of FIG. 2. (All reference numbers begin with the number of the drawing in which the component is first introduced). At block 302, search term suggestion (STS) module 212 (FIG. 2) collects historic query terms 216 from query log 220. STS module 212 organizes the historical query is 216 as a function of frequency of occurrence. At block 304, STS module 212 sends high frequency of occurrence query terms 222 to search engine 228 and receives corresponding search results 230. At block 306, STS module 212 extracts snippet descriptions from each search result(s) 230 and merges the snippet descriptions (extracted features 232) together to form term based MDO vectors 234. A respective term vector is generated for each respective high frequency of occurrence query term 222.

At block 308, STS module 212 mines "other MDOs" 218, for example, from query log(s) 220, Web site user access information, etc. STS module 212 generated respective MDO vectors 234 to represent the feature space of the mined "other MDOs" 218. At block 310, STS module 212 identifies intra-object and inter-object relationships/links between respective ones of the MDOs 214. At block 312, STS module 212 performs reinforced clustering of the MDOs 214 based on their respective MDO vectors 234 to generate reinforced clusters 236. Details of the reinforced clustering of heterogeneous data objects of block 312 are described in reference to FIG. 5 below. Procedure 300 continues at block 402 of FIG. 4 as shown by on-page reference "A".

Figure 4:
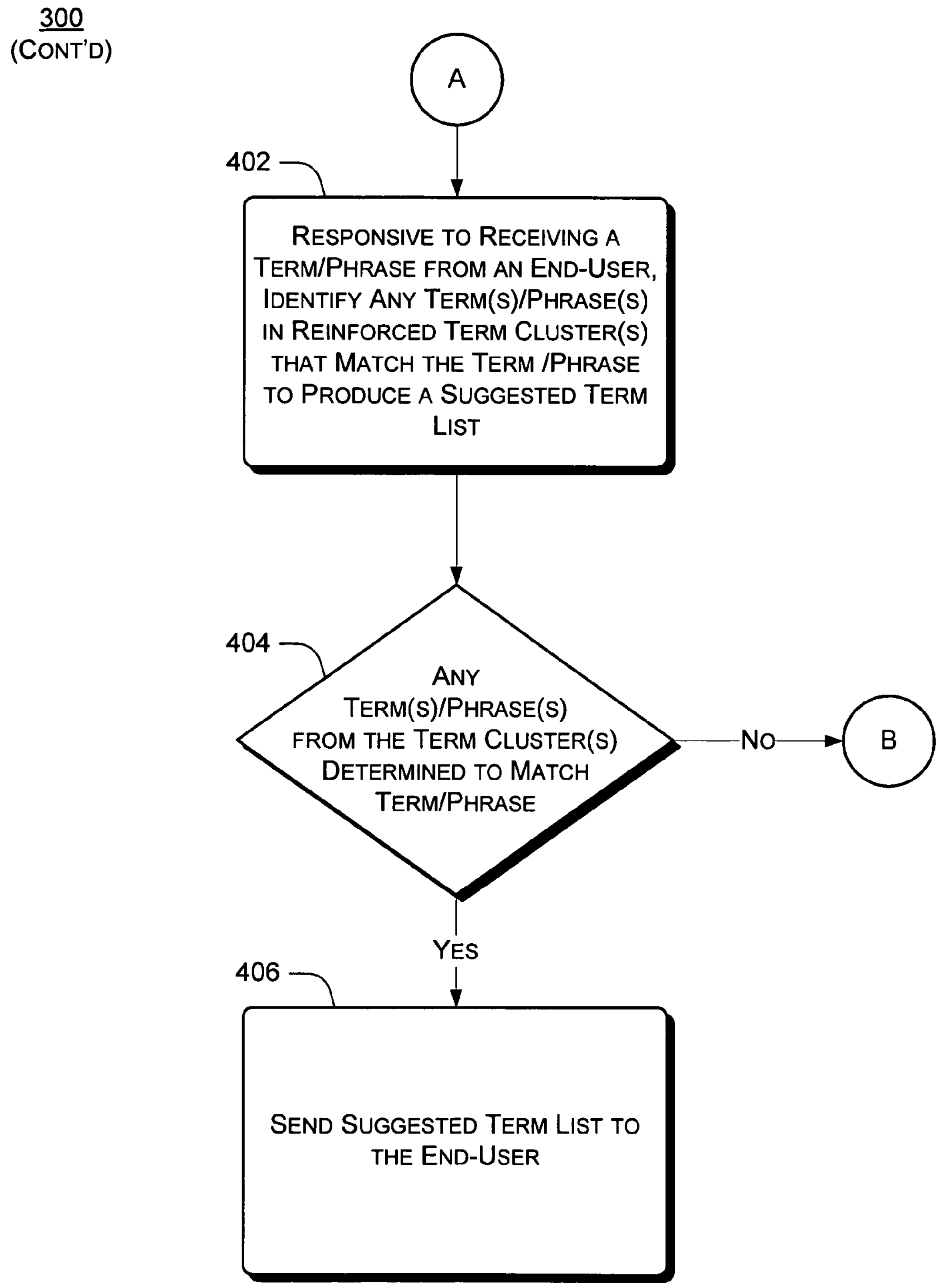
FIG. 4 is a continuation of the exemplary procedure 300 of FIG. 3 for reinforced clustering of multi-type data objects for search term suggestion.

FIG. 4 is a continuation of the exemplary procedure 300 of FIG. 3 for reinforced clustering of multi-type data objects for search term suggestion. For purposes of discussion, operations of the procedure are discussed in relation to the features of FIG. 2. At block 402, and responsive to receiving term(s) 208 (FIG. 2) from an end-user, STS module 212 generates a suggested term list 210 from any term(s) from the reinforced term clusters 236 determined to be substantially similar and related to the term(s) 208. We use interrelationships between different object types to improve the clustering. At block 404, STS module 212 determines whether any term(s) from keyword clusters 236 were determined to be substantially similar/related to term(s) 208. If so, the procedure continues at block 406, wherein STS module 212 sends a corresponding suggested term list 210 to the end-user. Otherwise, the procedure continues at block 502 of FIG. 5 as shown by on-page reference "B".

Figure 5:
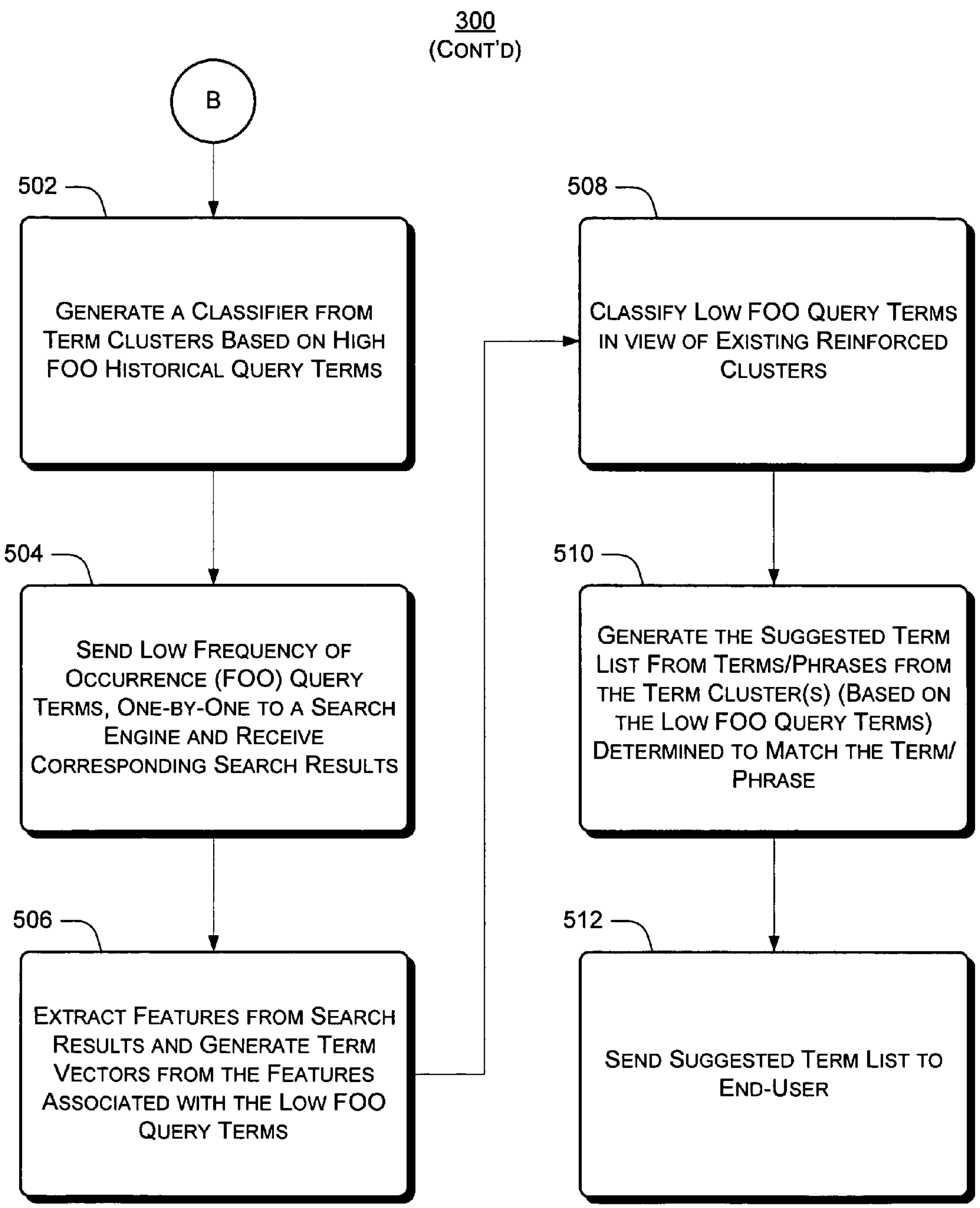
FIG. 5 is a continuation of the exemplary procedure 300 of FIGS. 3 and 4 for reinforced clustering of multi-type data objects for search term suggestion.

FIG. 5 is a continuation of the exemplary procedure 300 of FIGS. 3 and 4 for reinforced clustering of multi-type data objects for search term suggestion. For purposes of discussion, operations of the procedure are discussed in relation to the features of FIG. 2. (All reference numbers begin with the number of the drawing in which the component is first introduced). At block 502, STS module 212 generates a classifier 238 (trained classifier) from reinforced term clusters 236, which at this time are based on high frequency of occurrence query terms 222. At block 504, STS module 212 sends low frequency of occurrence query terms 224, one by one, to search engine 228 and receives corresponding search results 230. At block 506, STS module 212 extracts snippet descriptions (extracted features 232) from the search results 230, and generates term vectors 234 therefrom.

At block 508, STS module 212 classifies term vectors 234 generated from low frequency of occurrence query terms 224 in view of the trained classifier 238 to generate respective reinforced term clusters 236 based on the low frequency of occurrence query terms 224. At block 510, STS module 212 generates a suggested term list 210 from the keywords/key phrases from reinforced term clusters 236 based on the low frequency of occurrence query terms 224 that are determined to be substantially similar to the term(s) 208. At block 512, STS module 212 sends the suggested term list 210 to the end-user.

Figure 6:
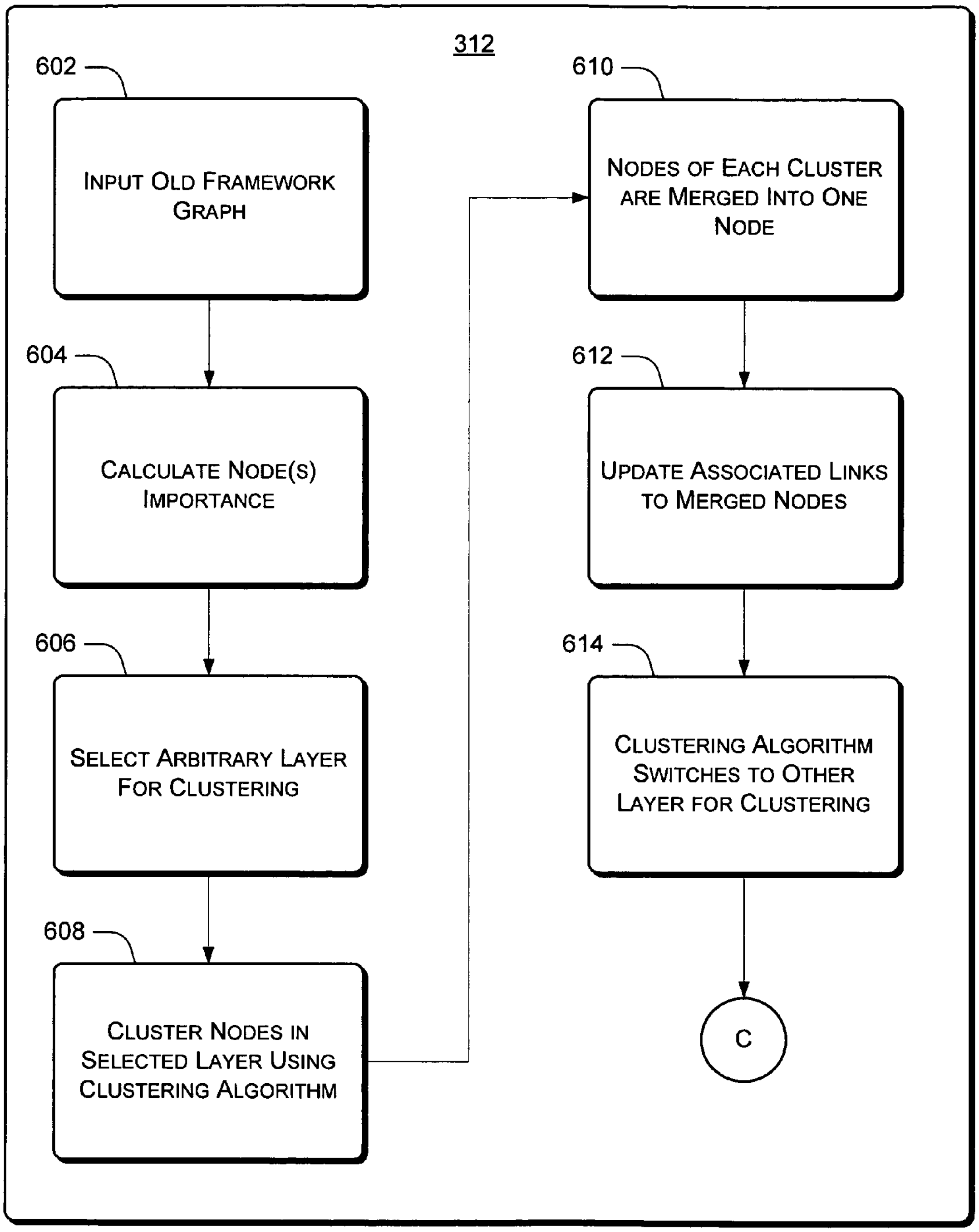
FIG. 6 illustrates an exemplary detailed of the reinforced clustering operations of block 312 of FIG. 3.

FIG. 6 illustrates an exemplary detailed of the reinforced clustering operations of block 312 of FIG. 3. For purposes of discussion, operations of block 310 are discussed in relation to the features of FIGS. 1 and 2. Input to the reinforced clustering algorithm implemented by STS module 212 includes a multi-layered framework graph such as the graph 100, which includes content features fi and gj of the corresponding nodes, including identified and weighted inter and intra-object relationships. Output of this clustering algorithm includes a new framework graph 100 that reflects the reinforced clustering of the multi-type data objects. In certain implementations of the new framework graph, variations of each old node that has changed into its new node position and/or merged with another node to reduce graph 100 dimensionality can be illustrated.

At block 602, the original framework graph (prior to each clustering iteration) is input. At block 604, the importance of each node being considered is determined or calculated using equation (2). At block 606, an arbitrary layer is selected for clustering. At block 608, nodes in the selected layer are clustered in an appropriate fashion (e.g., according to content features) to generate reinforced cluster 236. In certain implementations, the nodes can be filtered using a desired filtering algorithm (not shown) to improve the clustering. At block 610, the nodes of each cluster are merged into one node. For instance, if two candidate nodes exist following the filtering, the closest two candidate nodes can be merged, e.g., by averaging the vector values of the two candidate nodes. This merging allows individual nodes to be combined to reduce the number of nodes that have to be considered. As such, the merging operation can be used to reduce the occurrence of duplicates and near-duplicates. At block 612, the corresponding links are updated based on the merging in 610. At block 614, the clustering algorithm switches to a second layer (from the arbitrarily selected layer) for clustering. The operations of block 312 continue at block 702 of FIG. 7, as shown by on-page reference "C."

Referring to the operations of FIG. 6, note that in the initial clustering pass, only the content features are utilized. Because in most cases the link feature are too sparse in the beginning to be useful for clustering. In subsequent clustering passes, as described below in reference to FIG. 7, content features and link features are combined to enhance the effectiveness of the clustering. By combining the content features and the link features, the weights are specified with different values and the results can be compared, and clustering having an improved accuracy can be provided.

Figure 7:
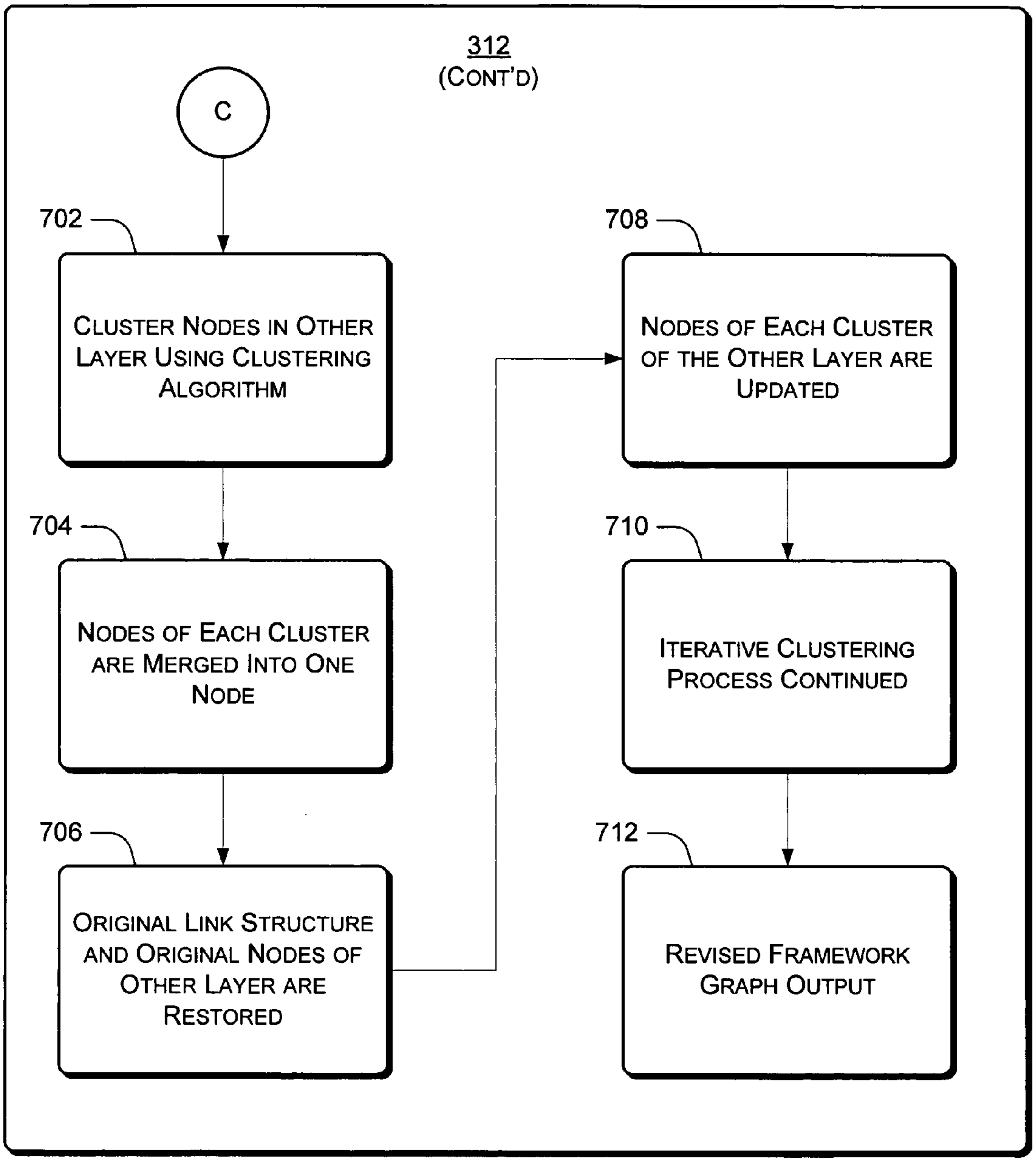
FIG. 7 illustrates an exemplary continuation of the reinforced clustering operations of block 312 of FIGS. 3 and 6.

FIG. 7 illustrates an exemplary continuation of the reinforced clustering operations of block 312 of FIGS. 3 and 6. At block 702, the nodes of the second layer are clustered according to their content features and updated link features. At block 704, the nodes of each cluster are merged into one node. At block 706, the original link structure and the original nodes of the other layer are restored. At block 708, the nodes of each cluster of the second layer are merged, and the corresponding links are updated. At block 710, this iterative clustering process is continued within the computer environment. At block 712, a revised version of the framework graph 100 is output.

An Exemplary Operating Environment

Figure 8:
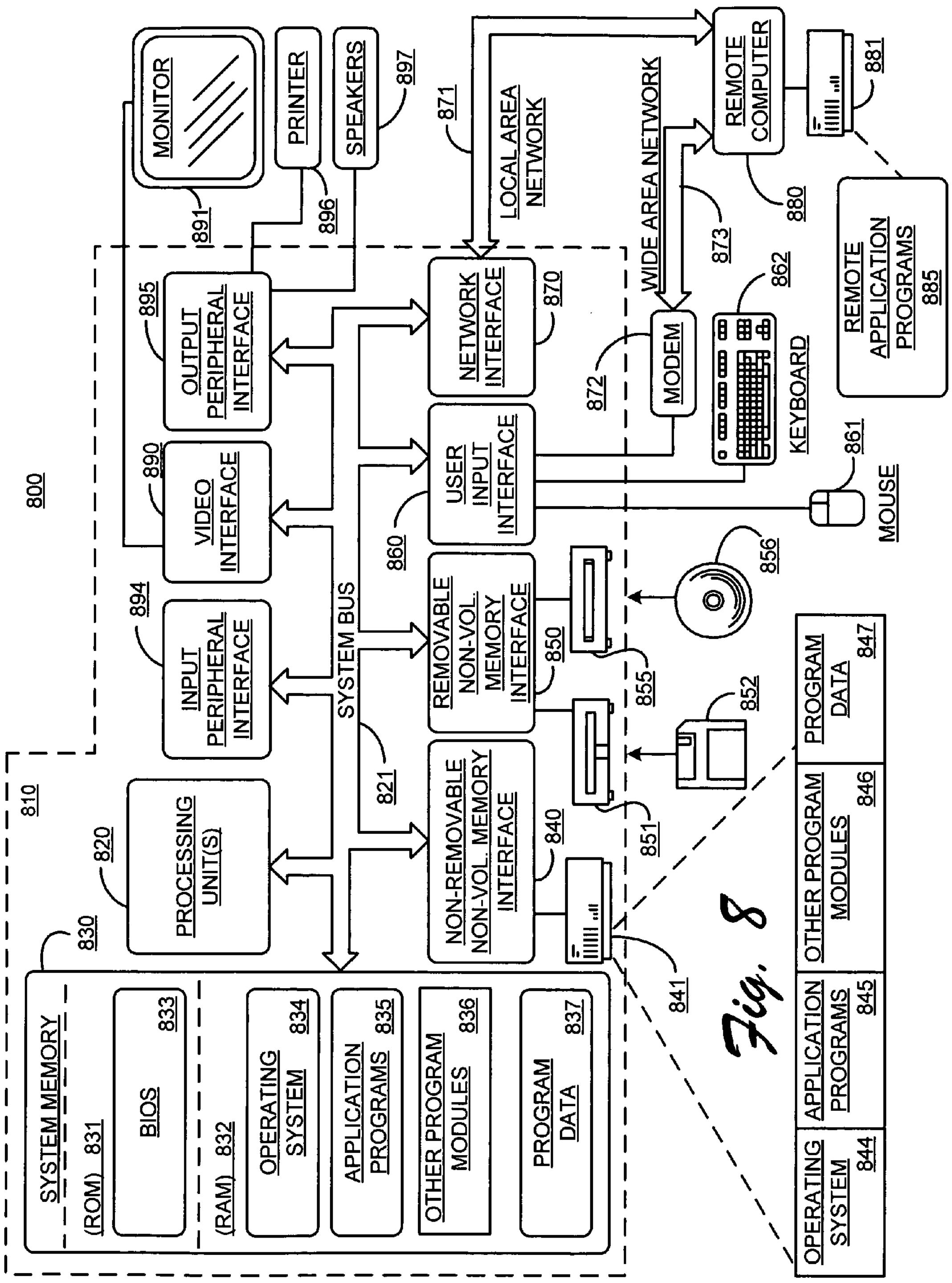
FIG. 8 shows an exemplary suitable computing environment on which the subsequently described systems, apparatuses and methods for reinforced clustering of multi-type data objects for search term suggestion may be fully or partially implemented.

FIG. 8 illustrates an example of a suitable computing environment 800 on which the system 200 of FIG. 2 and the methodology of FIGS. 3 through 6 for reinforced clustering of multi-type data objects for search term suggestion may be fully or partially implemented. Exemplary computing environment 800 is only one example of a suitable computing environment and is not intended to suggest any limitation as to the scope of use or functionality of systems and methods the described herein. Neither should computing environment 800 be interpreted as having any dependency or requirement relating to any one or combination of components illustrated in computing environment 800.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 8, an exemplary system for reinforced clustering of multi-type data objects for search term suggestion includes a general purpose computing device in the form of a computer 810. The following described aspects of computer 810 are exemplary implementations of client computing device PSS server 202 (FIG. 2) and/or client computing device 206. Components of computer 810 may include, but are not limited to, processing unit(s) 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 810 typically includes a variety of computer-readable media. Computer-readable media can be any available media that can be accessed by computer 810 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example and not limitation, FIG. 8 illustrates operating system 834, application programs 835, other program modules 836, and program data 838. In one implementation, wherein computer 810 is a PSS server 202. In this scenario, application programs 835 comprise search term suggestion model 212. In this same scenario, program data 838 comprises multi-type data objects 214, search results 230, extracted features 232, MDO vectors 234, reinforced clusters 236, trained classifier 238, and other data 226.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846, and program data 848. Note that these components can either be the same as or different from operating system 834, application programs 835, other program modules 836, and program data 838. Operating system 844, application programs 845, other program modules 846, and program data 848 are given different numbers here to illustrate that they are at least different copies.

A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to the monitor, computers may also include other peripheral output devices such as speakers 898 and printer 896, which may be connected through an output peripheral interface 895.

The computer 810 operates in a networked environment using logical connections to one or more remote computers, such as a remote computer 880. The remote computer 880 may be a personal computer, a server, a router, a network PC, a peer device or other common network node, and as a function of its particular implementation, may include many or all of the elements described above relative to the computer 810, although only a memory storage device 881 has been illustrated in FIG. 8. The logical connections depicted in FIG. 8 include a local area network (LAN) 881 and a wide area network (WAN) 883, but may also include other networks. Such networking environments are commonplace in offices, enterprise-wide computer networks, intranets and the Internet.

When used in a LAN networking environment, the computer 810 is connected to the LAN 881 through a network interface or adapter 880. When used in a WAN networking environment, the computer 810 typically includes a modem 882 or other means for establishing communications over the WAN 883, such as the Internet. The modem 882, which may be internal or external, may be connected to the system bus 821 via the user input interface 860, or other appropriate mechanism. In a networked environment, program modules depicted relative to the computer 810, or portions thereof, may be stored in the remote memory storage device. By way of example and not limitation, FIG. 8 illustrates remote application programs 885 as residing on memory device 881. The network connections shown are exemplary and other means of establishing a communications link between the computers may be used.

CONCLUSION

Although the systems and methods for reinforced clustering of multi-type data objects for search term suggestion have been described in language specific to structural features and/or methodological operations or actions, it is understood that the implementations defined in the appended claims are not necessarily limited to the specific features or actions described. For instance, although the reinforced clustering of multi-type data objects is described in reference to application of search term suggestion, reinforced clustering of multi-type data objects the can be applied to many other types of applications that utilize clustering. Accordingly, the specific features and actions are disclosed as exemplary forms of implementing the claimed subject matter.

The invention claimed is:

1. A computer-implemented method performed by a computing device that has one or more processors to execute instructions, the method comprising:

identifying relationships between multi-type data objects that include at least one object of a first type and at least one object of a second type different from the first type, the relationships being at least one of intra-layer relationships or inter-layer relationships among the multi-type data objects;

iteratively clustering the multi-type data objects based on the relationships to generate reinforced clusters;

generating a list of suggested search terms associated with a bid term using the reinforced clusters, the search terms generated in response to receiving the bid term from a user;

transmitting, via a network interface, the list of suggested search terms to a user; and mutually reinforcing an importance of individual ones of the multi-type data objects within an object type and between different object types based on the following:

$$\begin{cases} a(X) = \beta L_X^T h(X) + (1-\beta) L_{XY} i(Y) \\ h(X) = \beta L_X a(X) + (1-\beta) L_{XY} i(Y) \\ i(X) = a(X) + h(X) \\ \\ a(Y) = \gamma L_Y^T h(Y) + (1-\gamma) L_{YX} i(X) \\ h(Y) = \gamma L_Y a(Y) + (1-\gamma) L_{YX} i(X) \\ i(Y) = a(Y) + h(Y) \end{cases}$$

wherein $X=\{x_1, x_2, \ldots x_m\}$ and $Y=\{y_1, y_2, \ldots y_n\}$ represent respective object sets of heterogeneous object type with relationships $R_X$, $R_Y$, $R_{XY}$ and $R_{YX}$ if directionality is considered $L_X$ and $L_Y$ represent adjacent matrixes of links identifying relationships within set X and Y respectively, $L_{XY}$ and $L_{YX}$ represent adjacent matrixes of links identifying relationships from objects in X to objects in Y, a(X) and h(X) are an authority score and a hub score of nodes within X respectively, a(Y) and h(Y) respectively represent authority scores and hub scores of nodes in Y, i(X) and i(Y) respectively represent an importance of the nodes in X and Y, and $\beta$ and $\gamma$ are weight parameters to adjust influence of links derived from different relationships.

2. The method of claim 1, wherein the inter-layer relationships include at least one of content related information, user interest in an associated topic, and user interest in an associated Web page.

3. The method of claim 1, wherein the intra-layer relationships include at least one of query refinement, recommended Web page, and relationship between respective users.

4. The method of claim 1, wherein each of the multi-type data objects are related to at least one of a selected Web page type and a user information type.

5. The method of claim 1, wherein the intra-layer relationships include a first weighting scheme and the intra-layer relationships include a second weighting scheme different than the first weighting scheme to indicate importance to associated objects of the multi-type data objects.

6. The method of claim 1, wherein the identifying and the iteratively clustering are performed for the suggested searched terms.

7. The method of claim 1, wherein the iteratively clustering comprises propagating clustering results of a first iteration to all related data objects of the multi-type data objects, at least two of the related data objects being of heterogeneous data type, the propagating being used to enhance clustering of respective ones of the multi-type data objects in a second iteration of reinforced clustering operations.

8. The method of claim 1, wherein the iteratively clustering comprises determining a similarity between individual ones of the multi-type data objects, the similarity being a function of at least one of inter-object and intra-object content similarity and similarities between the inter-layer relationships and the intra-layer relationships.

9. The method of claim 1, wherein the iteratively clustering comprises merging related ones of the multi-type data objects to reduce feature space dimensionality of the related ones.

10. The method of claim 1, wherein the method further comprises mutually reinforcing an importance of individual ones of the multi-type data objects within an object type and between different object types.

11. The method of claim 1, further comprising:

comparing the bid term with a feature space of objects in the reinforced clusters to identify the suggested search terms.

12. A computer-readable storage medium comprising computer-executable instructions executable by a processor for:

identifying at least one of intra-layer and inter-layer relationships among multi-type data objects, wherein the multi-type data objects comprise at least one object of a first type and at least one object of a second type different from the first type;

iteratively clustering the multi-type data objects by at least one of the relationships to generate reinforced clusters;

generating a list of suggested search terms associated with a bid term using the reinforced clusters, the suggested search terms generated in response to receiving the bid term from a user; and mutually reinforcing an importance of individual ones of the multi-type data objects within an object type and between different object types based on the following:

$$\begin{cases} a(X) = \beta L_X^T h(X) + (1-\beta) L_{XY} i(Y) \\ h(X) = \beta L_X a(X) + (1-\beta) L_{XY} i(Y) \\ i(X) = a(X) + h(X) \\ \\ a(Y) = \gamma L_Y^T h(Y) + (1-\gamma) L_{YX} i(X) \\ h(Y) = \gamma L_Y a(Y) + (1-\gamma) L_{YX} i(X) \\ i(Y) = a(Y) + h(Y) \end{cases}$$

wherein $X=\{x_1, x_2, \ldots x_m\}$ and $Y=\{y_1, y_2, \ldots y_n\}$ represent respective object sets of heterogeneous object type with relationships $R_X$, $R_Y$, $R_{XY}$ and $R_{YX}$ if directionality is considered, $L_X$ and $L_Y$ represent adjacent matrixes of links identifying relationships within set X and Y respectively, $L_{XY}$ and $L_{YX}$ represent adjacent matrixes of links identifying relationships from objects in X to objects in Y, a(X) and h(X) are an authority score and a hub score of nodes within X respectively, a(Y) and h(Y) respectively represent authority scores and hub scores of nodes in Y, i(X) and i(Y) respectively represent an importance of the nodes in X and Y, and $\beta$ and $\gamma$ are weight parameters to adjust influence of links derived from different relationships.

13. The computer-readable storage medium of claim 12, wherein the inter-layer relationships comprise at least one of content related information, user interest in an associated topic, and user interest in an associated Web page.

14. The computer-readable storage medium of claim 12, wherein the intra-layer relationships comprise at least one of query refinement, recommended Web page, and relationship between respective users.

15. The computer-readable storage medium of claim 12, wherein each of the multi-type data objects are related to at least one of a search query data object type, a selected Web page type, and a user information type.

16. The computer-readable storage medium of claim 12, wherein The at least one of the identified relationships are weighted to indicate an importance to associated objects of the multi-type data objects.

17. The computer-readable storage medium of claim 12, wherein the identifying and the iteratively clustering are performed for the suggested search term.

18. The computer-readable storage medium of claim 12, wherein the iteratively clustering comprises propagating clustering results of a first iteration to all related data objects of the multi-type data objects, at least two of the related data objects being of heterogeneous data type, the propagating being used to enhance clustering of respective ones of the multi-type data objects in a second iteration of reinforced clustering operations.

19. The computer-readable storage medium of claim 12, wherein the iteratively clustering comprises determining a similarity between individual ones of the multi-type data objects, the similarity being a function of at least on of object content similarity and similarities between at least one of the identified relationships.

20. The computer-readable storage medium of claim 12, wherein the iteratively clustering comprises merging related ones of the multi-type data objects to reduce feature space dimensionality of the related ones.

21. The computer-readable storage medium of claim 12, wherein the instructions further comprise instructions for mutually reinforcing an importance of individual ones of the multi-type data objects within an object type and between different object types.

22. The computer-readable storage medium of claim 12, wherein the instructions further comprise:

comparing the bid term with a feature space of objects in the reinforced clusters to identify the suggested search terms.

* * * * *

UNITED STATES PATENT AND TRADEMARK OFFICE

CERTIFICATE OF CORRECTION

PATENT NO. : 7,689,585 B2
APPLICATION NO. : 10/826159
DATED : March 30, 2010
INVENTOR(S) : Hua-Jun Zeng et al.

It is certified that error appears in the above-identified patent and that said Letters Patent is hereby corrected as shown below:

In column 20, line 53, in Claim 1, delete "considered" and insert -- considered, --, therefor.

In column 21, line 7, in Claim 5, delete "intra-layer" and insert -- inter-layer --, therefor.

In column 21, line 14, in Claim 6, delete "searched" and insert -- search --, therefor.

In column 22, line 30, in Claim 16, after "wherein" delete "The".

In column 22, line 48, in Claim 19, delete "on" and insert -- one --, therefor.

Signed and Sealed this
Twenty-fifth Day of January, 2011

David J. Kappos

David J. Kappos
*Director of the United States Patent and Trademark Office*